(12) United States Patent
Schallmeier et al.

(10) Patent No.: US 10,112,454 B2
(45) Date of Patent: Oct. 30, 2018

(54) CLOSING COVER WITH INTEGRATED PRESSURE RETENTION VALVE HOUSING FOR AIR SPRING APPLICATIONS

(71) Applicant: Continental Automotive Systems, Inc., Auburn Hills, MI (US)

(72) Inventors: Christian Schallmeier, Lake Orion, MI (US); Garrett M. Pniewski, Bloomfield, MI (US); Sunny Makkar, Troy, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 49 days.

(21) Appl. No.: 14/551,408

(22) Filed: Nov. 24, 2014

(65) Prior Publication Data

US 2016/0144683 A1 May 26, 2016

(51) Int. Cl.
*B60G 17/052* (2006.01)
*B60G 11/27* (2006.01)

(52) U.S. Cl.
CPC .......... *B60G 17/0528* (2013.01); *B60G 11/27* (2013.01); *B60G 2202/152* (2013.01); *B60G 2500/201* (2013.01); *B60G 2500/204* (2013.01)

(58) Field of Classification Search
CPC .............. B60G 2206/424; B60G 11/26; B60G 2202/152; B60G 2500/2014; B60G 17/0155; B60G 17/0523; B60G 17/052; B60G 17/01; F16F 9/0281; F16F 9/0218; F16F 9/0472; F16F 9/43; F16K 41/00; F16K 41/10; F16K 17/06; Y10T 137/5283; Y10T 137/7895; Y10T 137/7896; Y10T 137/7861; Y10T 137/7878; Y10T 137/87241; Y10T 137/86919; F17C 13/00; F17C 13/04; F17C 2201/032; F17C 2201/058; F17C 2203/0617; F17C 2205/0335; F17C 2205/0394; F17C 2205/0385; F17C 2260/013; F17C 2260/028; Y10S 280/01
USPC ..... 267/64.28, 64.24, 64.23, 64.27; 137/511, 137/516.11, 516.13–515.29, 528, 529, 137/271; 251/89, 61.4–61.5, 335.3
See application file for complete search history.

(56) References Cited

U.S. PATENT DOCUMENTS

| | | | | |
|---|---|---|---|---|
| 2,895,633 | A * | 7/1959 | Zellweger | F17C 1/14 220/266 |
| 2,973,954 | A * | 3/1961 | Eater | B60G 17/0485 137/596.2 |
| 3,027,915 | A * | 4/1962 | Huffman | F16K 17/06 137/516.15 |

(Continued)

FOREIGN PATENT DOCUMENTS

CN 104019258 A * 9/2014

*Primary Examiner* — Robert A. Siconolfi
*Assistant Examiner* — San Aung

(57) ABSTRACT

A closing cover assembly for an air spring includes a first portion defining a first internal space constructed and arranged to receive a portion of an air spring. A second portion is integral with and extends from the first portion. The second portion defines a second internal space. A passageway connects the first internal space with the second internal space. A pressure retention valve having a main body is received in the second internal space, with the second portion of the cover defining an outer protective housing for the main body of the pressure retention valve.

17 Claims, 1 Drawing Sheet

(56) References Cited

U.S. PATENT DOCUMENTS

| | | | | |
|---|---|---|---|---|
| 3,747,629 | A * | 7/1973 | Bauman | G05D 16/0661 137/270 |
| 4,168,721 | A * | 9/1979 | Mueller, Jr. | G05D 16/02 137/514.7 |
| 4,299,250 | A * | 11/1981 | Happe | F16K 15/14 137/516.11 |
| 4,570,972 | A * | 2/1986 | Pangos | B60G 17/0525 137/493 |
| 4,854,343 | A * | 8/1989 | Rilett | A62C 13/76 137/543.19 |
| 5,564,520 | A * | 10/1996 | Forsythe | B60N 2/1665 137/38 |
| 6,173,738 | B1 * | 1/2001 | Opara | B60G 17/0523 137/508 |
| 2005/0199290 | A1 * | 9/2005 | Hsiao | F16K 17/30 137/517 |
| 2005/0224117 | A1 * | 10/2005 | Youngberg | G05D 16/0608 137/505.25 |
| 2008/0011361 | A1 * | 1/2008 | Larsen | G05D 16/103 137/528 |
| 2008/0237514 | A1 * | 10/2008 | Yonezawa | F15B 11/0445 251/121 |
| 2009/0101215 | A1 * | 4/2009 | Colby | F16K 1/307 137/505.42 |
| 2010/0089471 | A1 * | 4/2010 | Zakay | G01F 7/00 137/528 |

* cited by examiner

CLOSING COVER WITH INTEGRATED PRESSURE RETENTION VALVE HOUSING FOR AIR SPRING APPLICATIONS

FIELD

This invention relates to an air spring for a vehicle and, in particular, to a closing cover for the air spring that has an integrated pressure retention valve housing.

BACKGROUND

With reference to FIG. 1, a conventional air spring strut for a vehicle is shown generally indicated at 10. A closing cover 12, disposed above an air spring 14, is used to close the air spring strut 10. A separate pressure retention valve, generally indicated at 16, is coupled to the cover 12, typically by a threaded nipple 19 engaged with the cover 12. Due to the separate parts of the cover 12 and valve 16, the valve 16 requires its own protective housing 17 over a main body thereof, which adds cost and weight to the strut 10.

Thus, there is a need to provide an air spring cover that provides an integrated housing for the pressure retention valve.

SUMMARY

An objective of the invention is to fulfill the need referred to above. In accordance with the principles of an embodiment, this objective is achieved a closing cover for an air spring. The closing cover includes a base and a first portion integral with and extending from the base. The first portion defines a first internal space constructed and arranged to receive a portion of an air spring. A second portion of the cover is integral with and extends from the first portion. The second portion defines a second internal space constructed and arranged to receive a main body of a pressure retention valve to thereby define an outer protective housing for the main body of the pressure retention valve. A passageway connects the first internal space with the second internal space.

In accordance with another aspect of an embodiment, a closing cover assembly for an air spring includes a cover having first portion defining a first internal space constructed and arranged to receive a portion of an air spring. A second portion of the cover is integral with and extends from the first portion. The second portion defines a second internal space. A passageway connects the first internal space with the second internal space. A pressure retention valve, having a main body, is received in the second internal space, with the second portion of the cover defining an outer protective housing for the main body of the pressure retention valve.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 2:
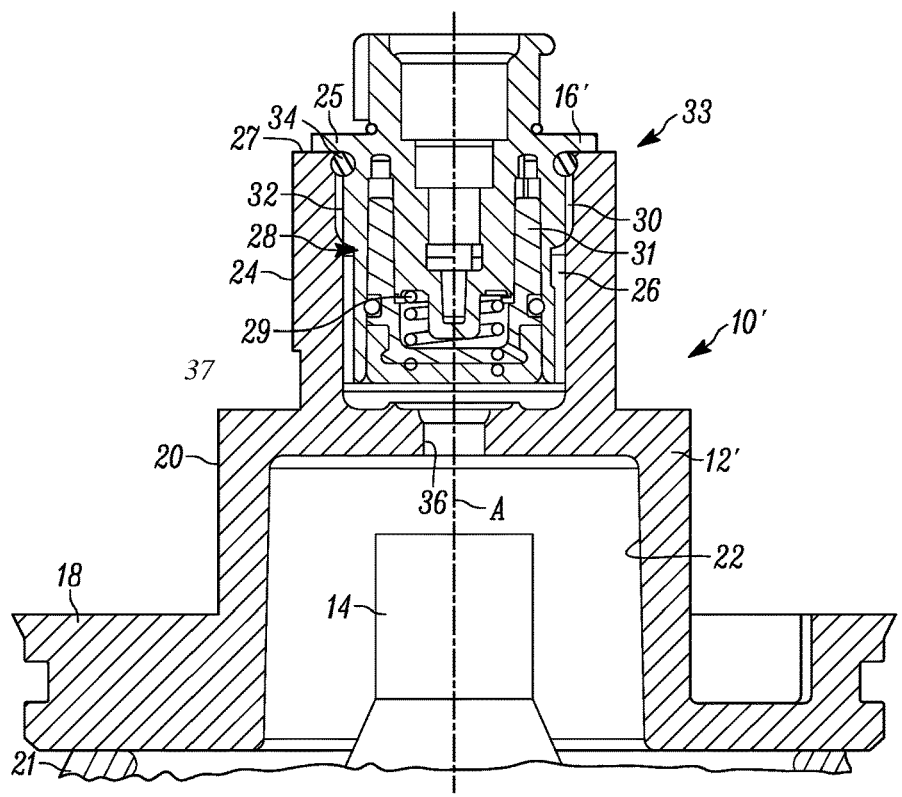
FIG. 2 is an enlarged sectional view of an air spring strut having a closing cover with an integrated housing for a pressure retention valve in accordance with an embodiment.

With reference to FIG. 2, an air spring strut is shown generally indicated at 10' in accordance with an embodiment. The strut 10' is for use in a vehicle's electronic air suspension system. The strut 10' includes a closing cover 12' disposed above an air spring 14. The cover 12' is used to close the air spring strut 10'. The cover 12' is preferably made of aluminum, steel or plastic and includes a base 18 for engaging an end 21 of the air spring 14. A first portion 20 of the cover 12' is integral with and extends from the base 18 and defines a generally cylindrical, first internal space 22 that receives a portion of the air spring 14.

A second portion 24 of the cover 12' is integral with and extends from the first portion 20. The second portion 24 defines a generally cylindrical, second internal space 26 that receives a main body 28 of a pressure retention valve 16'. More particularly, the valve 16' includes a mounting flange 25 that engages and end 27 of the second portion 24 of the cover 12'. The main body 28 of the valve 16', disposed below the flange 25, is surrounded by the second portion 24 of the cover 12'. The main body 28 includes a spring 29 and valve member 31 of the valve 16'. Thus, the pressure retention valve 16' is a separate member mounted in the second internal space 26.

Figure 1:
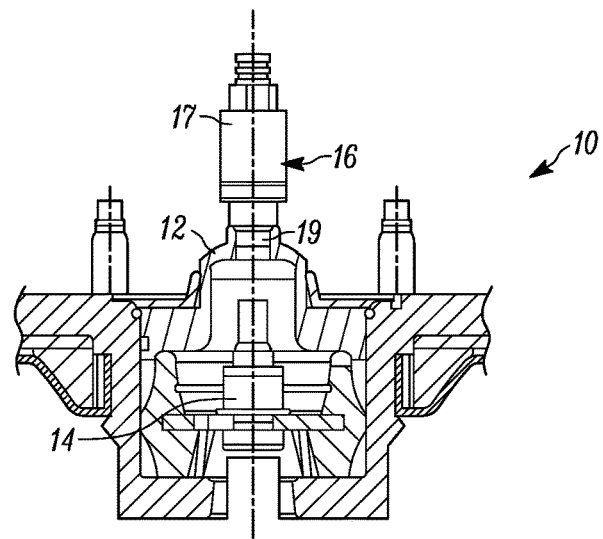
FIG. 1 is sectional view of a conventional air spring strut having a closing cover and pressure retention valve having a protective housing.

In the embodiment, the main body 28 of the valve 16' includes external threads 30 and the second portion 24 includes mating internal threads 32 for coupling the valve 16' to the second portion 24. An O-ring 34 provides a seal between the valve 16' and second portion 24 adjacent to the threads 30, 32. Alternatively, the valve 16' can be welded or glued, in a sealing manner, to the second portion 24 of the cover 12' and no O-ring would be needed. Thus, the cylindrical second portion 24 of the cover 12' acts as a protective housing that substantially surrounds the main body 28 of the valve 16'. Therefore, the valve 16' need not require a separate, protective outer housing 17 as in in the conventional valve 16 of FIG. 1. The cover 12' and valve 16', when coupled together, define a closing cover assembly 33.

A passage 36 extends through a wall 37 that separates the first internal space 22 from the second internal space 26. The passage 36 connects the first internal space 22 with the second internal space 26 so that the pressure retention valve 16' is exposed to pressure in the first internal space 22. In the embodiment, the first internal space 22 and the second internal space 26 are disposed along the same axis A. It can be appreciated that the spaces 22 and 26 can be offset from each other and connected via a passage 36 if desired.

Due to the cover 12' having the integral housing 24 for the valve 16', the overall cost of the air spring strut 10' can be reduced and a more compact configuration of the strut 10' can be provided.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A closing cover for an air spring comprising:
 a base having an end constructed and arranged to engage an end of an air spring;
 a first portion integral with and extending axially from the base, the first portion defining a first internal space constructed and arranged to receive a portion of the air spring;
 a second portion, integral with and extending axially from the first portion, the second portion defining a second internal space constructed and arranged to receive a main body of a pressure retention valve to thereby define an outer protective housing for the main body of the pressure retention valve, wherein the first internal space is substantially larger than the second internal space;
 a spring-operated pressure retention valve inside the second internal space;
 a wall, separate from and axially spaced from the end of the base, the wall separating the first internal space from the second internal space; and
 a passageway extending through the wall and connecting the first internal space with the second internal space so that the pressure retention valve is exposed to pressure in the first internal space,
 wherein the closing cover is in combination with an air spring of a vehicle, the cover being engaged with the air spring.

2. The closing cover of claim 1, wherein the first internal space and the second internal space are disposed on a common axis.

3. The closing cover of claim 1, wherein each of the first internal space and the second internal space is generally cylindrical.

4. The closing cover of claim 1, wherein each of the base, the first portion and the second portion is composed of aluminum.

5. The closing cover of claim 1, wherein each of the base, the first portion and the second portion is composed of steel.

6. The closing cover of claim 1, wherein each of the base, the first portion and the second portion is composed of plastic.

7. The closing cover of claim 1, wherein the pressure retention valve includes a flange engaging an end of the second portion of the cover.

8. The closing cover of claim 1, wherein a portion of the main body that is received in the second internal space includes threads engaged with threads of the second portion of the cover.

9. The closing cover of claim 8, further comprising an O-ring between the pressure retention valve and the second portion of the cover and adjacent to the engaged threads.

10. A closing cover assembly for an air spring comprising:
 a cover comprising:
  a base having an end constructed and arranged to engage an end of an air spring,
  a first portion extending axially from the base and defining a first internal space constructed and arranged to receive a portion of an air spring, the end of the base extending radially beyond an extent of the first portion,
  a second portion, integral with and extending axially from the first portion, the second portion defining a second internal space, wherein the first internal space is substantially larger than the second internal space,
  a wall separating the first internal space from the second internal space, and
  a passageway extending through the wall and connecting the first internal space with the second internal space, and
 a spring-operated pressure retention valve enclosed within the second internal space,
 wherein the closing cover assembly is in combination with an air spring of a vehicle, the cover being engaged with the air spring.

11. The closing cover assembly of claim 10, wherein the first internal space and the second internal space are disposed on a common axis.

12. The closing cover assembly of claim 10, wherein each of the first internal space and the second internal space is generally cylindrical.

13. The closing cover assembly of claim 10, wherein each of the base, the first portion and the second portion is composed of aluminum, steel or plastic.

14. The closing cover assembly of claim 10, wherein the pressure retention valve includes a flange engaging an end of the second portion of the cover.

15. The closing cover assembly of claim 10, wherein a portion of the main body that is received in the second internal space includes threads engaged with threads of the second portion of the cover.

16. The closing cover assembly of claim 15, further comprising an O-ring between the pressure retention valve and the second portion of the cover and adjacent to the engaged threads.

17. The closing cover of claim 1, wherein the end of the base extends radially beyond an extent of the first portion.

* * * * *